United States Patent
Kim et al.

(10) Patent No.: US 8,208,177 B2
(45) Date of Patent: Jun. 26, 2012

(54) METHOD OF CORRECTING SCAN DATA AND IMAGE FORMING DEVICE TO PERFORM THE METHOD

(75) Inventors: Jung-hun Kim, Pohang-si (KR); Tae-wook Kong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 622 days.

(21) Appl. No.: 12/470,570

(22) Filed: May 22, 2009

(65) Prior Publication Data

US 2010/0110501 A1  May 6, 2010

(30) Foreign Application Priority Data

Nov. 3, 2008  (KR) ................. 10-2008-108491

(51) Int. Cl.
*G06T 5/00* (2006.01)
*H04N 1/407* (2006.01)
*H04N 1/409* (2006.01)

(52) U.S. Cl. ........ 358/3.26; 358/296; 358/450; 382/294

(58) Field of Classification Search ............... 399/17
See application file for complete search history.

(56) References Cited

U.S. PATENT DOCUMENTS

| 4,823,289 | A  | * | 4/1989  | Hirosawa et al. | 358/296 |
| 2002/0163530 | A1 | * | 11/2002 | Takakura et al. | 345/629 |
| 2004/0240894 | A1 | * | 12/2004 | Tomita et al. | 399/17 |
| 2005/0196070 | A1 | * | 9/2005 | Takakura et al. | 382/294 |
| 2007/0263233 | A1 | * | 11/2007 | Mei et al. | 358/448 |
| 2009/0097076 | A1 | * | 4/2009 | Fujiwara | 358/448 |

* cited by examiner

*Primary Examiner* — Twyler Haskins
*Assistant Examiner* — Nicholas Pachol
(74) *Attorney, Agent, or Firm* — Stanzione & Kim, LLP (57) ABSTRACT

A method of correcting scan data obtained by an image forming device including a scan glass having a specific damaged area, the method including generating first scan data by scanning a file placed on the scan glass, generating second scan data by rotating the file by a first angle and scanning the file, correcting the first data values of the first scan data scanned in the specific damaged area by using the second scan data, and storing the corrected first scan data.

19 Claims, 6 Drawing Sheets

| 220 | | | | | | | | | | | | | 210 | 200 |
|---|---|---|---|---|---|---|---|---|---|---|---|---|---|---|
| 1 | 11 | 21 | 31 | 41 | 51 | 61 | 71 | 81 | 91 | 101 | 111 | 121 | 131 | 141 | 151 |
| 2 | 12 | 22 | 32 | 42 | 52 | 62 | 72 | 82 | 92 | 102 | 112 | 122 | 132 | 142 | 152 |
| 3 | 13 | 23 | 32 | 43 | 53 | 63 | 73 | 83 | 93 | 103 | 113 | 123 | 133 | 143 | 153 |
| 4 | 14 | 24 | 34 | 44 | 54 | 64 | 74 | 84 | 94 | 104 | 114 | 124 | 134 | 144 | 154 |
| 5 | 15 | 25 | 35 | 45 | 55 | 65 | 75 | 85 | 95 | 105 | 115 | 125 | 135 | 145 | 155 |
| 6 | 16 | 26 | 36 | 46 | 56 | 66 | 76 | 86 | 96 | 106 | 116 | 126 | 136 | 146 | 156 |
| 7 | 17 | 27 | 37 | 47 | 57 | 67 | 77 | 87 | 97 | 107 | 117 | 127 | 137 | 147 | 157 |
| 8 | 18 | 28 | 38 | 48 | 58 | 68 | 78 | 88 | 98 | 108 | 118 | 128 | 138 | 148 | 158 |
| 9 | 19 | 29 | 39 | 49 | 59 | 69 | 79 | 89 | 99 | 109 | 119 | 129 | 139 | 149 | 159 |
| 10 | 20 | 30 | 40 | 50 | 60 | 70 | 80 | 90 | 100 | 110 | 120 | 130 | 140 | 150 | 160 |

METHOD OF CORRECTING SCAN DATA AND IMAGE FORMING DEVICE TO PERFORM THE METHOD

CROSS-REFERENCE TO RELATED APPLICATIONS

This application claims the benefit under 35 U.S.C. §119 (a) from Korean Patent Application No. 10-2008-0108491, filed on Nov. 3, 2008, in the Korean Intellectual Property Office, the disclosure of which is incorporated herein in its entirety by reference.

BACKGROUND

1. Field of the General Inventive Concept

The present general inventive concept relates to a method of correcting scan data generated by scanning a file and an image forming device to perform the method.

2. Description of the Related Art

In general, image forming devices perform at least one of various functions such as printing, copying, scanning, and faxing. When image forming devices perform a scan function, a file that is to be scanned is placed on a scan glass of the image forming device, the file is scanned, and then scan data is generated. However, if a specific area of the scan glass is damaged, for example, if the specific area of the scan glass is cracked or stained with an unremovable impurity, the file and the damaged specific area would overlap, thereby making it impossible to clearly scan the file. Thus, if the file is scanned on the damaged scan glass, abnormal scan data would be generated.

SUMMARY

The present general inventive concept provides a method of correcting scan data generated by scanning a file in an image forming device, and an image forming device to perform the method.

Additional features and/or utilities of the present general inventive concept will be set forth in part in the description which follows and, in part, will be obvious from the description, or may be learned by practice of the general inventive concept.

Embodiments of the present general inventive concept can be achieve by providing a method of correcting scan data performed by an image forming device including a scan glass having a specific damaged area, the method including generating first scan data by scanning a file that is to be scanned and placed on the scan glass, generating second scan data by rotating the file by a first angle and scanning the file, correcting first data values of the first scan data scanned in the specific damaged area by using the second scan data, and storing the corrected first scan data.

Embodiments of the present general inventive concept can also be achieved by providing a computer readable recording medium having recorded thereon a program to execute the method used to correct scan data.

Embodiments of the present general inventive concept can also be achieved by providing an image forming device including a scan glass having a specific damaged area, the device including a scanning unit to generate first scan data by scanning a file that is to be scanned placed on the scan glass, and to generate second scan data by rotating the file by a first angle and scanning the file, a scan data processing unit to correct first data values of the first scan data scanned in the specific damaged area by using the second scan data, a storage unit to store the first scan data, the second scan data, and the corrected first scan data, and a controller to control operations of the scanning unit, the scan data processing unit, and the storage unit.

Embodiments of the present general inventive concept can also be achieved by providing a method to adjust scan data obtained by an image forming apparatus including a scan portion having a first scan area and a second scan area, the method including generating a first signal representing a first scan data of a file disposed on the scan portion, generating a second signal representing a second scan data of the file repositioned on the scan portion, and transmitting a third signal representing the first scan data adjusted based on the second scan data.

Embodiments of the present general inventive concept can also be achieved by providing an image forming apparatus used to adjust scan data, the image forming apparatus including a scan portion having a first scan area and a second scan area to generate a first signal representing a first scan data of a file disposed on the scan portion and a second signal representing a second scan data of the file repositioned on the scan portion, and a scan data processing unit to adjust the first scan data based on the second scan data, wherein the first scan area corresponds to a damaged scan portion and the second scan area corresponds to an undamaged scan portion.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
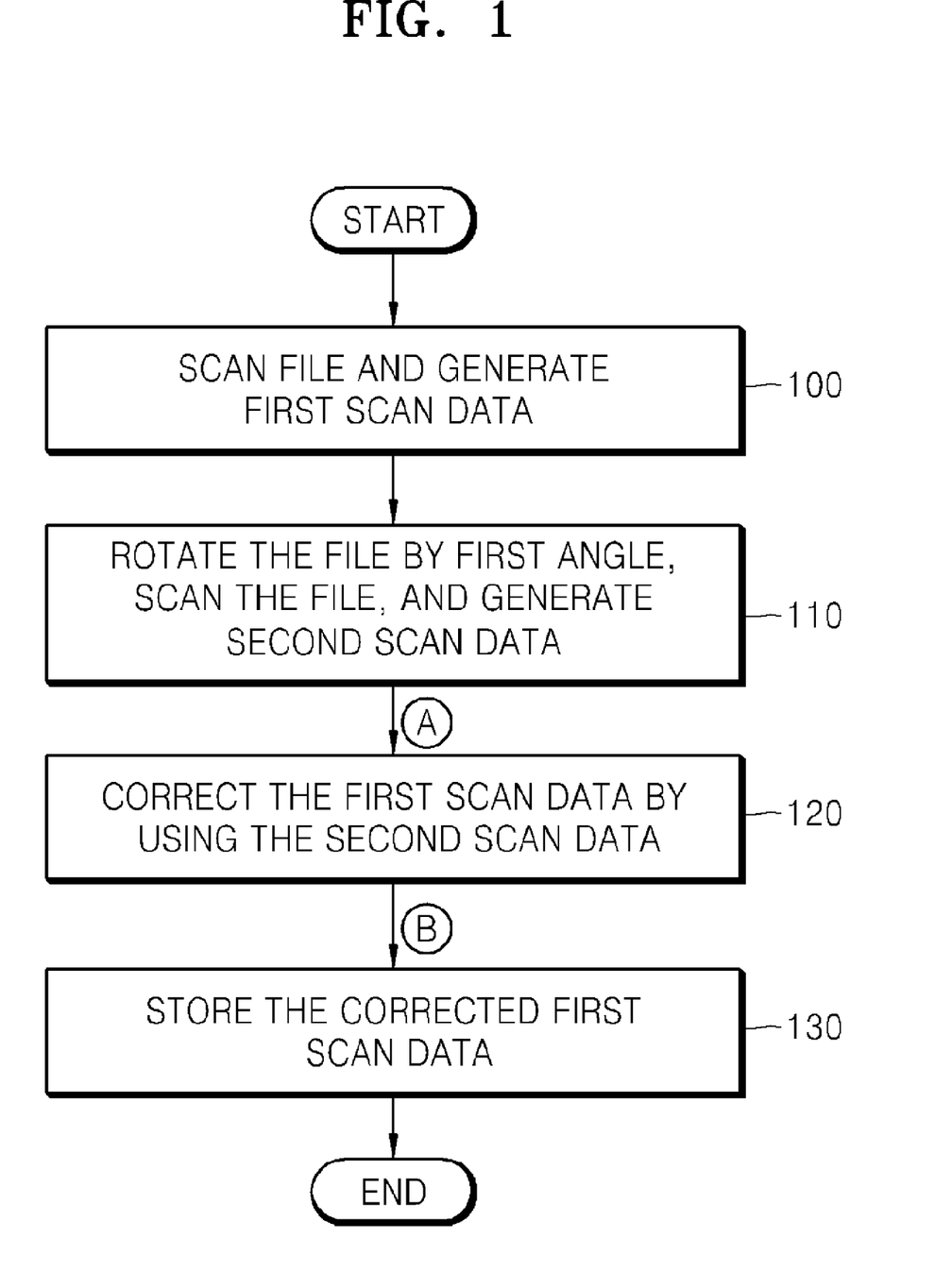
FIG. 1 is a flowchart illustrating a method of correcting scan data according to an exemplary embodiment of the present general inventive concept.

FIG. 1 is a flowchart illustrating a method of correcting scan data according to an exemplary embodiment of the present general inventive concept. Referring to FIG. 1, in operation 100, a file is scanned, and a first scan data is generated. In exemplary embodiments, an image forming device used to perform a scan function includes a scan glass having a first scan area and a second scan area to scan the file. In the present exemplary embodiment, the file is scanned on a specific area of the scan glass (i.e., the first scan area) which is scratched or stained with an unremovable impurity. In exemplary embodiments, the file is disposed on the first scan area which corresponds to a damaged portion of the scan glass, and on the second scan area which corresponds to an undamaged portion of the scan glass. In the present exemplary embodiment, the scan glass includes a specific damaged area having at least one of polygonal shapes including a rectangular shape or oval shapes including a circular shape. However, the present general inventive concept is not limited thereto. After the file is placed on the scan glass, if a scan unit of the image forming device is operated, the scan unit scans the file by using a general scan function, and generates the first scan data. In exemplary embodiments, the first scan data may be represented by a first signal. In this regard, the general scan function optically scans the file, measures an intensity of a reflective light or a transparent light, performs an A/D conversion with the intensity, and obtains a digital image. The file may be a document, a photo, a film, a drawing, and the like including characters, symbols, images, and the like. However, the present general inventive concept is not limited thereto.

Figure 2:
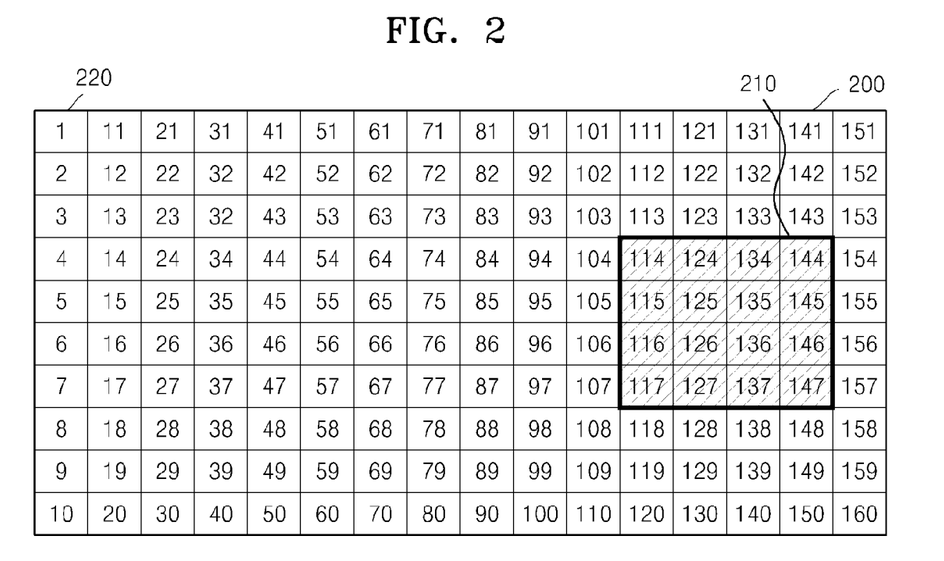
FIG. 2 is a diagram of a scan glass having a damaged specific area according to an exemplary embodiment of the present general inventive concept.

FIG. 2 is a diagram of a scan glass 200 having a specific damaged area 210 according to an exemplary embodiment of the present general inventive concept. Referring to FIG. 2, the scan glass 200 includes numbers between 1 through 160, which is an order of pixel data used to generate scan data. In more detail, if a scanning unit (not illustrated) of the image forming device performs a scanning operation, the scan data is generated in a unit of pixel 220. The pixel data illustrated in FIG. 2 is generated in the order of numbers 1 through 160, and the scan data is generated. In exemplary embodiments, the specific damaged area 210 of the scan glass 200 is caused by a scratch or impurities. However, the present general inventive concept is not limited thereto. That is, the specific damaged area 210 may be caused by various other defects. In this regard, the specific damaged area 210 may be established by inputting a coordinate value corresponding to the specific damaged area 210 which is input in view of the scan glass 200. In alternative exemplary embodiments, a user may input a location of the specific damaged area 210 identified by a coordinate value or the image forming apparatus may further include various sensors and/or detectors (not illustrated) to identify the specific damaged areas 210 of the scan glass 200.

Figure 3:
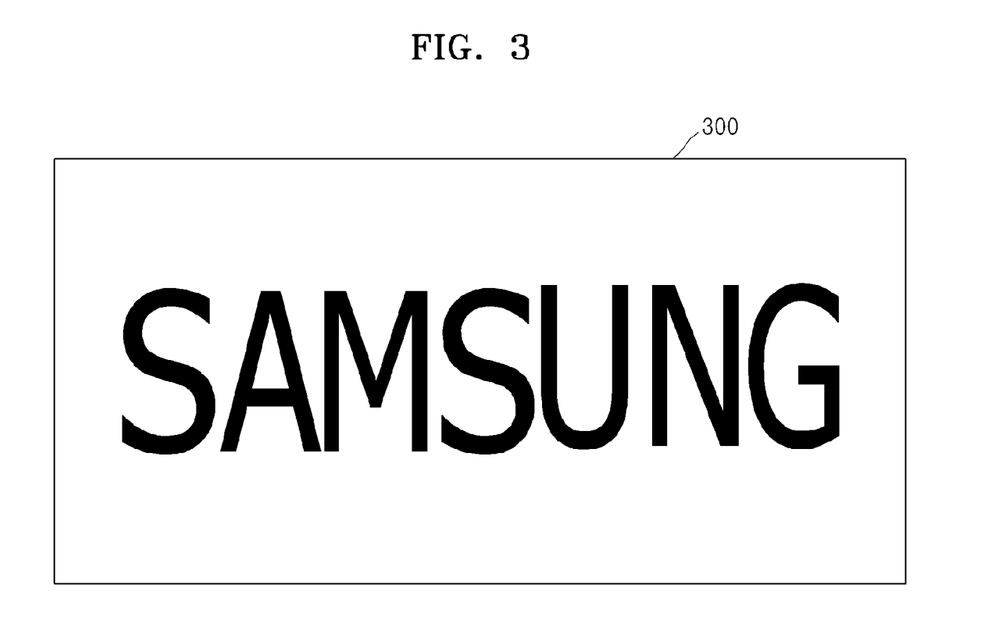
FIG. 3 is a diagram of a file that is to be scanned according to an exemplary embodiment of the present general inventive concept.

FIG. 3 is a diagram of a file 300 that is to be scanned according to an exemplary embodiment of the present general inventive concept. Referring to FIG. 3, the file 300 is a document including the characters "SAMSUNG."

Figure 4:
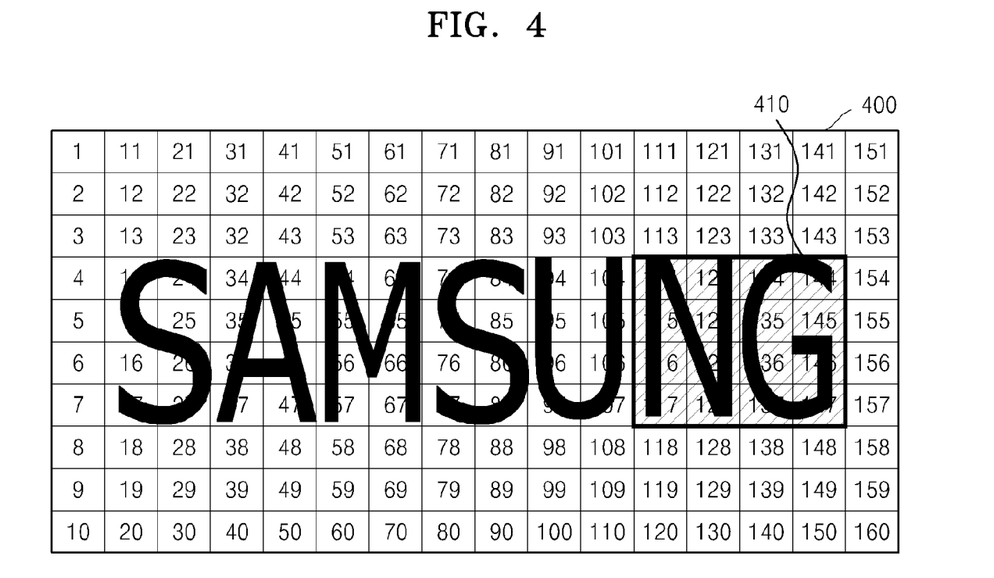
FIG. 4 is a diagram of first scan data according to an exemplary embodiment of the present general inventive concept.

FIG. 4 is a diagram of a first scan data 400 according to an exemplary embodiment of the present general inventive concept. In an exemplary embodiment, the file 300 is placed on the scan glass 200 and the file 300 is scanned, so that the first scan data 400 is generated. However, since the scan glass 200 includes the damaged specific area 210, referring to FIG. 4, an area 410 of the first scan data 400 corresponding to the damaged specific area 210 of the scan glass 200 includes unclear characters. In more detail, the first scan data 400 includes pixel data of numbers between 1 through 160, and the pixel data is unclear in the area 410 which includes numbers "114, 115, 116, 117, 124, 125, 126, 127, 134, 135, 136, 137, 144, 145, 146, and 147." That is, the characters "NG" of the characters "SAMSUNG" included in the file 300 are not clear.

Referring back to FIG. 1, in operation 110, the file is rotated by a first angle, the rotated file is scanned, and a second scan data is generated. In exemplary embodiments, the second scan data may be represented by a second signal. After the file placed on the scan glass is rotated by the first angle, if the scanning unit of the image forming device is operated, the scanning unit scans the file by using a general scan function, and generates the second scan data. In this regard, the first angle may be 180 degrees, however, the present general inventive concept is not limited thereto. That is, the file may be rotated by various other angles and/or repositioned in various other orientations if the first scan data and the second scan data corresponding to the specific damaged area 210 of the scan glass 200 do not overlap.

Figure 5:
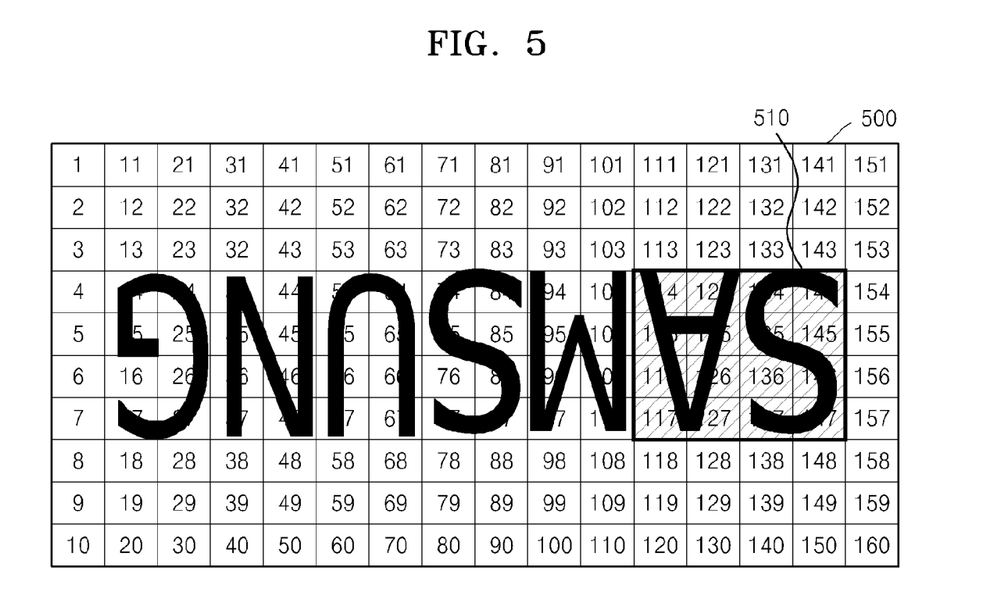
FIG. 5 is a diagram of second scan data generated at a first angle of 180 degrees according to an exemplary embodiment of the present general inventive concept.

FIG. 5 is a diagram of second scan data 500 generated when the file is rotated at a first angle of 180 degrees according to an exemplary embodiment of the present general inventive concept. Referring to FIG. 5, if the file 300 placed on the scan glass 200 is rotated by 180 degrees and is scanned, the second scan data 500 is generated. The second scan data 500 is unclear in an area 510 including numbers "114, 115, 116, 117, 124, 125, 126, 127, 134, 135, 136, 137, 144, 145, 146, and 147". That is, the characters "SA" of the characters "SAMSUNG" included in the file 300 are not clear.

Referring to FIG. 1, in operation 120, the second scan data is used to correct the first scan data. In alternative exemplary embodiments, the first scan data may be used to correct the second scan data. When the first scan data is used to correct the second scan data, a process performed in the first scan data is performed in the second scan data, and a process performed in the second scan data is performed in the first scan data.

Figure 6:
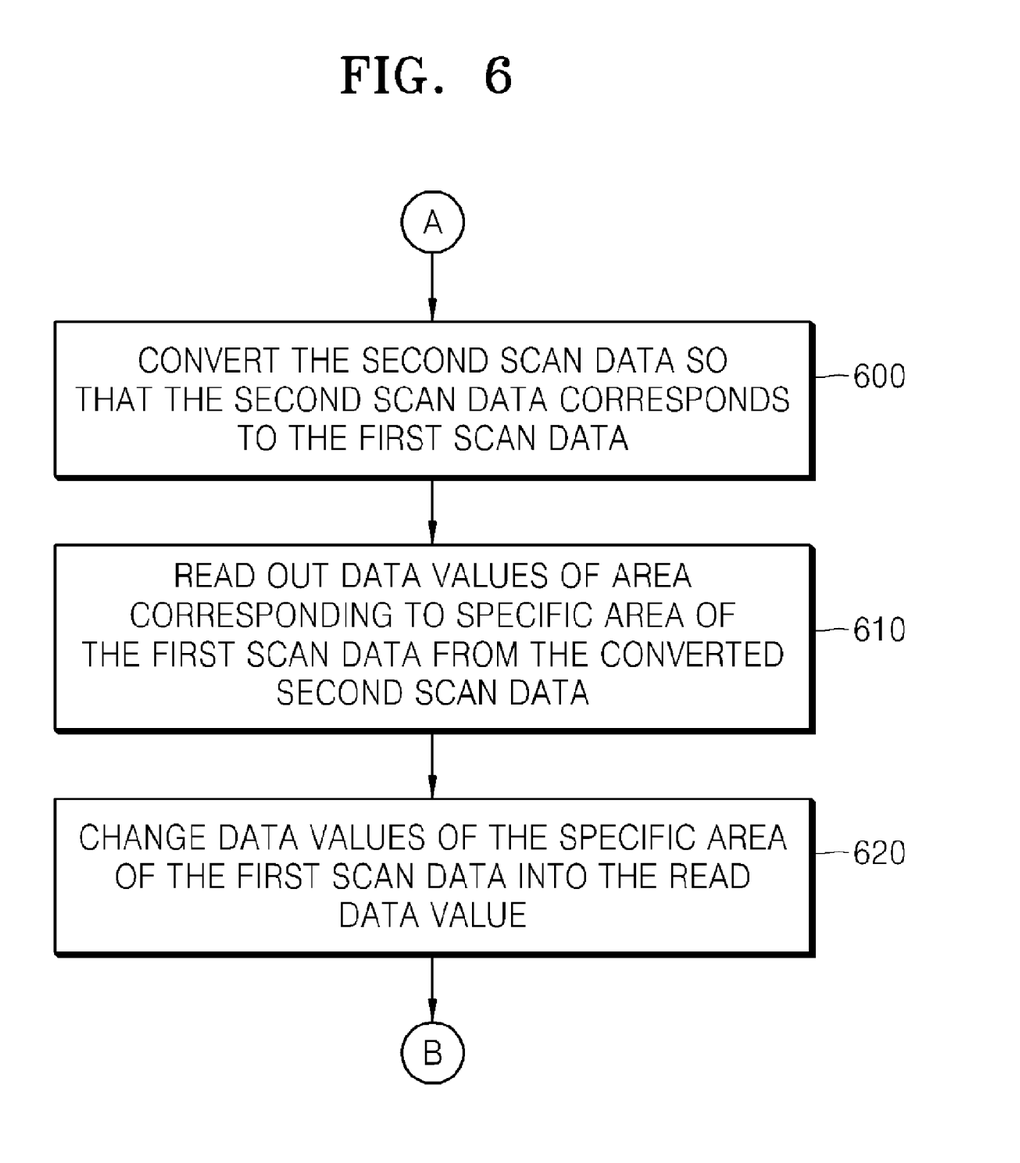
FIG. 6 is a flowchart illustrating an operation to correct the first scan data by using the second scan data illustrated in FIG. 1 according to an exemplary embodiment of the present general inventive concept.

FIG. 6 is a flowchart illustrating operation 120 illustrated in FIG. 1, according to an exemplary embodiment of the present general inventive concept. Referring to FIG. 6, in operation 600, the second scan data is converted so that the second scan data corresponds to the first scan data, by reading out data values from the second scan data in the same order as data values of the first scan data, and rearranging the data values in the order of the data values of the first scan data. That is, the data values between 160 through 1 are read from the second scan data 500 illustrated in FIG. 5. The data values are rearranged in the reading order and the second scan data is converted.

Figure 7:
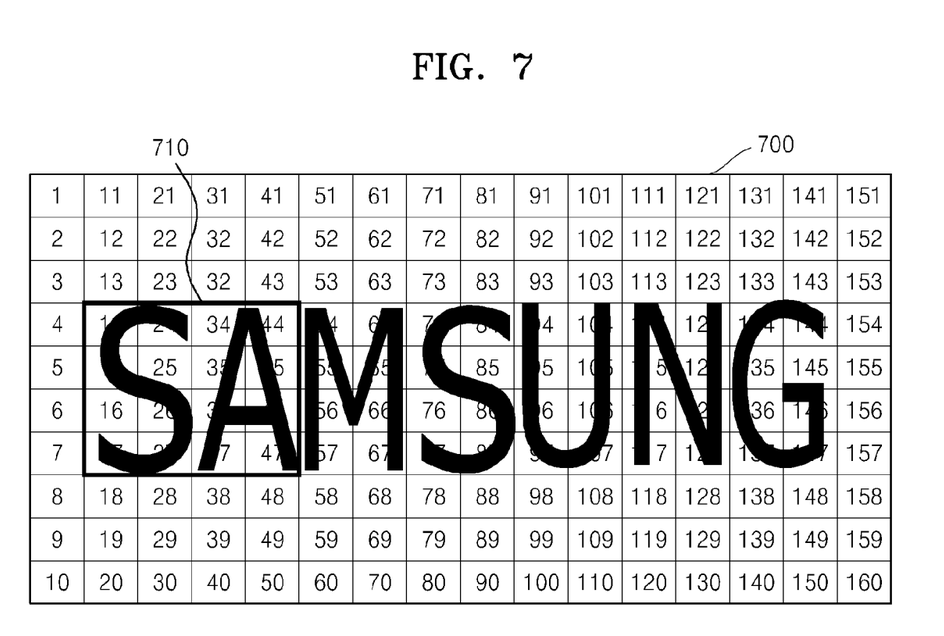
FIG. 7 is a diagram of converted second scan data according to an exemplary embodiment of the present general inventive concept.

FIG. 7 is a diagram of the converted second scan data 700 according to an exemplary embodiment of the present general inventive concept. Referring to FIG. 7, if the second scan data is converted so that the second scan data corresponds to the first scan data, unclear characters "SA" are included in an area 710 of the converted second scan data 700 including numbers "14, 15, 16, 17, 24, 25, 26, 27, 34, 35, 36, 37, 44, 45, 46, and 47."

Referring to FIG. 6, in operation 610, the data values of an area corresponding to a specific area of the first scan data are read from the converted second scan data. In an exemplary embodiment, the data values of "114, 115, 116, 117, 124, 125, 126, 127, 134, 135, 136, 137, 144, 145, 146, and 147" included in an area corresponding to the area 410 of the first scan data 400 may be read from the second scan data 700 illustrated in FIG. 7.

In operation 620, the data values of the specific area of the first scan data are converted into the read data values. In an exemplary embodiment, the data values of "114, 115, 116, 117, 124, 125, 126, 127, 134, 135, 136, 137, 144, 145, 146, and 147" included in the area 410 of the first scan data 400 are converted into the data values read in operation 620.

Referring now to FIG. 1, in operation 130, the corrected first scan data is stored. In exemplary embodiments, the stored first scan data may be printed on a printing medium and may be externally output. However, the present general inventive concept is not limited thereto.

Figure 8:
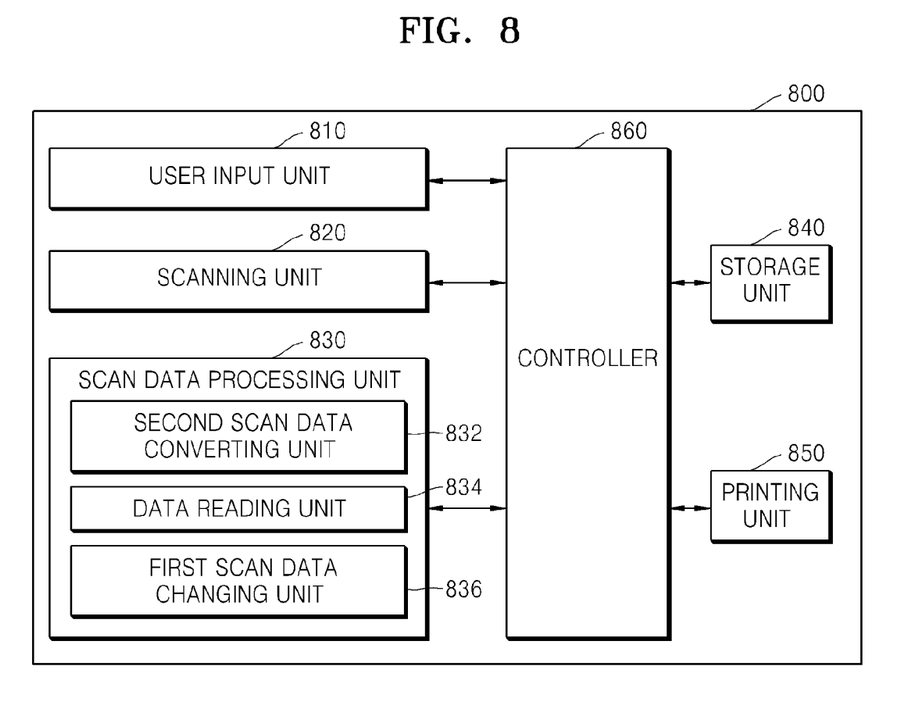
FIG. 8 is a block diagram of an image forming device that performs a method used to correct scan data according to an exemplary embodiment of the present general inventive concept.

FIG. 8 is a block diagram of an image forming device 800 that performs a method used to correct scan data according to an exemplary embodiment of the present general inventive concept. Referring to FIG. 8, the image forming device 800 includes a user input unit 810, a scanning unit 820, a scan data processing unit 830, a storage unit 840, a printing unit 850, and a controller 860.

The user input unit 810 inputs a coordinate value in view of a scan glass (not illustrated) of the image forming device 800 and establishes a specific area of the scan glass. In exemplary embodiments, the scan glass may be damaged by a scratch or by impurities. The specific damaged area may be established as the coordinate value in view of the scan glass. Thus, a specific area of the scan glass may be established by using the user input unit 810. In this regard, the user input unit 810 may include a plurality of function keys (not illustrated) included in a front panel of the image forming device 800.

The scanning unit 820 scans a file that is to be scanned by using a general scan function, and generates scan data. The scanning unit 820 scans the file placed on the scan glass, generates first scan data, rotates the file by a first angle, scans the file, and generates second scan data. In an exemplary embodiment, after the file 300 illustrated in FIG. 3 is placed on the scan glass 200 illustrated in FIG. 2, if the scanning unit 820 scans the file 300, the first scan data 400 illustrated in FIG. 4 may be generated. Also, after the file 300 is rotated by 180 degrees in the scan glass 200, if the scanning unit 820 scans the file 300, the second scan data 500 illustrated in FIG. 5 may be generated. However, the present general inventive concept is not limited thereto.

The scan data processing unit 830 corrects the first scan data by using the second scan data. More specifically, the scan data processing unit 830 includes a second scan data converting unit 832, a data reading unit 834, and a first scan data changing unit 836.

The second scan data converting unit 832 converts the second scan data so that the second scan data corresponds to the first scan data by reading out data values from the second scan data in the same order as data values of the first scan data and rearranging the read data values in the order of the data values of the first scan data. In an exemplary embodiment, the data values between 160 through 1 that are in the same order as the data values of the first scan data are read from the second scan data 500 illustrated in FIG. 5, the read data values are rearranged in the reading order, and the second scan data is converted. The converted second scan data is described with reference to FIG. 7.

The data reading unit 834 reads out data values of an area corresponding to a specific area of the first scan data from the converted second scan data. In an exemplary embodiment, the data values of "114, 115, 116, 117, 124, 125, 126, 127, 134, 135, 136, 137, 144, 145, 146, and 147" included in the area corresponding to the area 410 of the first scan data 400 are read from the converted second scan data 700 illustrated in FIG. 7. However, the present general inventive concept is not limited thereto.

The first scan data changing unit 836 changes the data values of the specific area of the first scan data into the read data values. In an exemplary embodiment, the data values of "114, 115, 116, 117, 124, 125, 126, 127, 134, 135, 136, 137, 144, 145, 146, and 147" included in the area 410 of the first scan data 400 are changed into the data values read from the second scan data 700 by using the data reading unit 834.

In exemplary embodiments, the storage unit 840 includes a non-volatile memory to store various programs necessary for realizing the function of the image forming device 800 and a volatile memory to temporarily store data generated during a program operation of the controller 860. In an exemplary embodiment, the storage unit 840 may temporarily store the scan data generated by the scanning unit 820 and the scan data converted by the scan data processing unit 830. However, the present general inventive concept is not limited thereto.

The printing unit 850, which is an element used to print data on a printing sheet according to a general process performed by the image forming device 800, may print the scan data generated by the scanning unit 820 on the printing sheet according to the controller 860.

The controller 860 controls the general function of the image forming device 800. In more detail, the controller 860 controls the input and output of a signal between the user input unit 810, the scanning unit 820, the scan data processing unit 830, the storage unit 840, and the printing unit 850. However, the present general inventive concept is not limited thereto.

Figure 9:
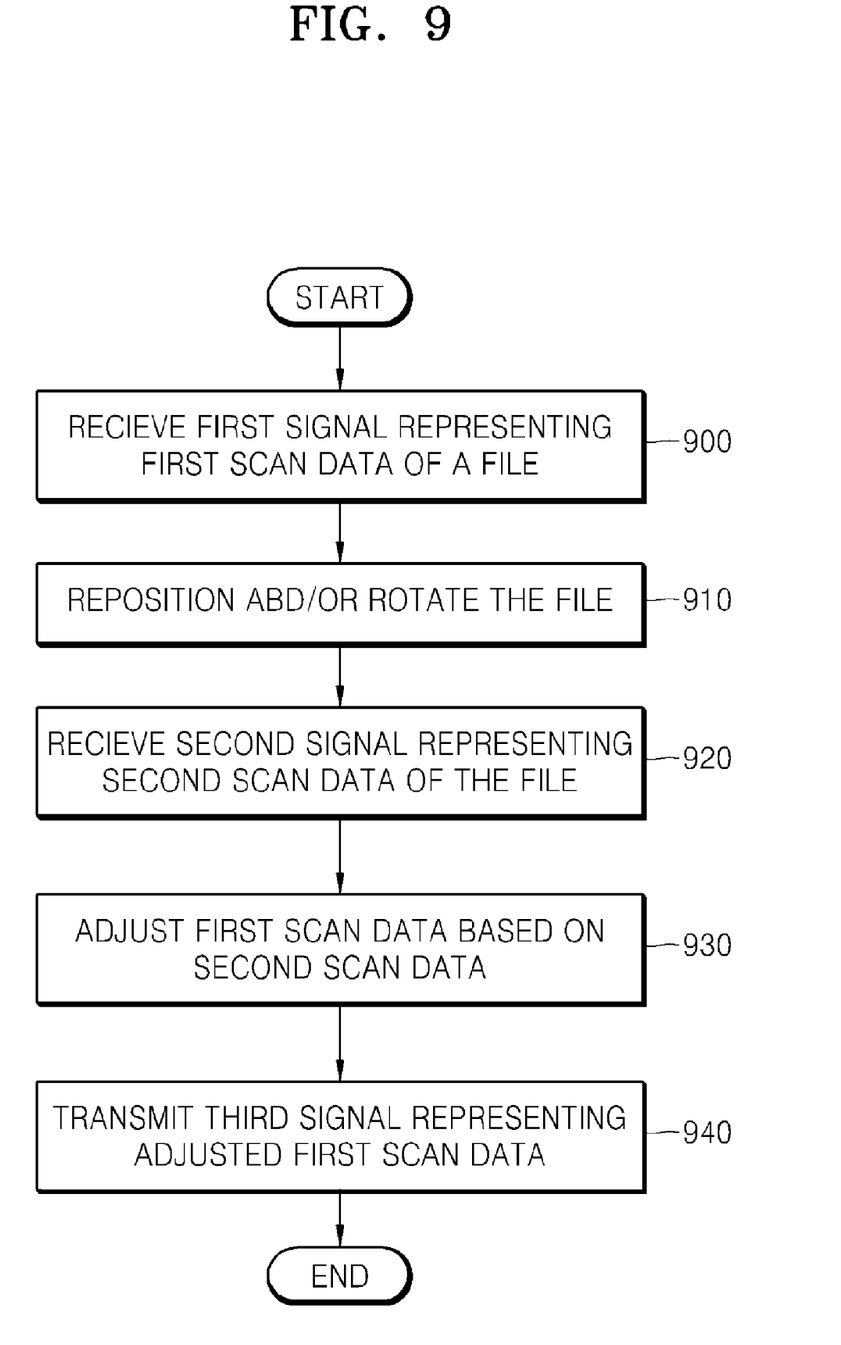
FIG. 9 is a flowchart illustrating a method to correct scan data according to another exemplary embodiment of the present invention general inventive concept.

FIG. 9 is a flowchart illustrating a method to correct scan data according to another exemplary embodiment of the present general inventive concept. Referring to FIG. 9, in operation 900, a first signal representing a first scan data of a file 300 is received. The file 300 may be scanned by a scan portion (not illustrated) of an image forming device 800 (FIG. 8). The scan portion may include a first area corresponding to a specific damaged area 210 (FIG. 2) and a second area corresponding to an undamaged area of the scan glass 200 (FIG. 2). In an exemplary embodiment, a portion of the file 300 may be disposed in the first area and in the second area.

In operation 910, the file 300 is repositioned and/or rotated by an angle such that the portion of the file 300 disposed in the first area is replaced by the portion of the file which was disposed in the second area of the scan portion.

In operation 920, a second signal representing a second scan data of the file 300 is received. In operation 930, the first signal which represents the first scan data is adjusted and/or corrected based upon the second signal which represents the second scan data. In operation 940, a third signal which represents an adjusted and/or corrected first scan data is transmitted by the image forming device. That is, in operation 940, a scan data processing unit 830 (FIG. 8) may be used to adjust and/or correct the first scan data based on the second scan data.

The present general inventive concept may also be embodied as computer readable codes on a computer readable recording medium. The computer-readable medium can include a computer-readable recording medium and a computer-readable transmission medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept has been shown and described, it will be appreciated by those skilled in the art that various changes may be made in these embodiments without departing from the principles and spirit of the general inventive concept, the scope of which is defined in the appended claims and their equivalents.

What is claimed is:

1. A method of correcting scan data obtained by an image forming device including a scan glass having a specific damaged area, the method comprising:
   generating first scan data by scanning a file that is placed on the scan glass;
   generating second scan data by rotating the file by a first angle and scanning the file;
   correcting first data values of the first scan data scanned in the specific damaged area by using the second scan data; and
   storing the corrected first scan data.

2. The method of claim 1, wherein the correcting of the first data values of the first scan data comprises:
   converting the second scan data so that the second scan data corresponds to the first scan data;
   reading out second data values corresponding to the first data values from the converted second scan data; and
   changing the first data values of the first scan data into the second data value.

3. The method of claim 2, wherein the converting of the second scan data comprises:
   reading out data values from the second scan data in a same order as data values of the first scan data; and
   converting the second scan data by rearranging the read data values in the reading order.

4. The method of claim 2, wherein the first data values and the second data values are data values in a unit of pixels.

5. The method of claim 1, further comprising:
   establishing an externally input area as the specific damaged area.

6. The method of claim 1, further comprising:
   outputting the corrected first scan data.

7. The method of claim 1, wherein the specific damaged area is in a shape of at least one of polygonal shapes including a rectangular shape or oval shapes including a circular shape.

8. The method of claim 1, wherein the first angle is an angle that an area of the first scan data and an area of the second scan data that correspond to the specific damaged area do not overlap.

9. A computer readable recording medium having recorded thereon a program to execute the method of claim 1.

10. An image forming device including a scan glass having a specific damaged area, the device comprising:
    a scanning unit to generate first scan data by scanning a file placed on the scan glass, and generating second scan data by rotating the file by a first angle and scanning the file;
    a scan data processing unit to correct first data values of the first scan data scanned in the specific damaged area by using the second scan data;
    a storage unit to store the first scan data, the second scan data, and the corrected first scan data; and
    a controller to control operations of the scanning unit, the scan data processing unit, and the storage unit.

11. The device of claim 10, wherein the scan data processing unit comprises:
    a second scan data converting unit to convert the second scan data so that the second scan data corresponds to the first scan data;
    a data reading unit to read out second data values corresponding to the first data values from the converted second scan data; and
    a first scan data changing unit to change the first data values of the first scan data into the second data value.

12. The device of claim 11, wherein the second scan data converting unit converts the second scan data by reading out data values from the second scan data in a same order as data values of the first scan data and rearranging the read data values in the reading order.

13. The device of claim 11, wherein the first data values and the second data values are data values in a unit of pixels.

14. The device of claim 10, further comprising:
    a user input unit to establish the specific damaged area.

15. The device of claim 10, further comprising:
    a printing unit to output the corrected first scan data on a printing medium.

16. The device of claim 10, wherein the specific damaged area is in a shape of at least one of polygonal shapes including a rectangular shape or oval shapes including a circular shape.

17. The device of claim 10, wherein the first angle is an angle that an area of the first scan data and an area of by an image forming device including a scan glass having a specific damaged area includes generating first scan data by scanning a file that is to be scanned placed on the scan glass, generating second scan data by rotating the file by a first angle and scanning the file, correcting first data values of the first scan data scanned in the specific damaged area by using the second scan data, and storing the corrected first scan data.

18. A method to adjust scan data obtained by an image forming apparatus including a scan portion having a first scan area and a second scan area, the method comprising:
    generating a first signal representing first scan data of a file disposed on the scan portion;
    generating a second signal representing second scan data of the file repositioned on the scan portion; and
    transmitting a third signal representing adjusted first scan data based on the second scan data,
    wherein the first scan area corresponds to a damaged scan portion and the second scan area corresponds to an undamaged scan portion.

19. An image forming apparatus used to adjust scan data, comprising:
    a scan portion having a first area and a second area to generate a first signal representing first scan data of a file disposed on the scan portion and a second signal representing second scan data of the file repositioned on the scan portion; and
    a scan data processing unit to adjust the first scan data based on the second scan data,
    wherein the first area corresponds to a damaged scan portion and the second area corresponds to an undamaged scan portion.

* * * * *